United States Patent
Wu et al.

(10) Patent No.: US 7,013,066 B1
(45) Date of Patent: Mar. 14, 2006

(54) TUNABLE LONG PERIOD FIBER GRATING STRUCTURE AND FABRICATION METHOD

(75) Inventors: Enboa Wu, Taipei (TW); Rou-Ching Yang, Taipei (TW); Kuo-Ching San, Yongkang (TW)

(73) Assignee: National Taiwan University, (TW)

( * ) Notice: Subject to any disclaimer, the term of this patent is extended or adjusted under 35 U.S.C. 154(b) by 0 days.

(21) Appl. No.: 11/038,321

(22) Filed: Jan. 19, 2005

(51) Int. Cl.
*G02B 6/34* (2006.01)

(52) U.S. Cl. .......................... 385/37; 385/10
(58) Field of Classification Search .................. 385/10, 385/37
See application file for complete search history.

(56) References Cited

U.S. PATENT DOCUMENTS 6,603,916 B1 * 8/2003 McGreer et al. ............ 385/129

* cited by examiner

Primary Examiner—John D. Lee
Assistant Examiner—Rhonda S. Peace
(74) Attorney, Agent, or Firm—Schmeiser, Olsen & Watts

(57) ABSTRACT

The invention discloses a tunable long period fiber grating structure and fabrication method, which produces an expected microbending deformation by adjusting the temperature and making use of the unmatched coefficients of thermal expansion between different materials, and thus creating a phenomenon of mode coupling effect occurred in traditional optical gratings in order to provide the structure and fabrication method for having an effect of tuning spectra by controlling the temperature. This invention not only can be applied to the optical communications and wavelength dependent multiplexed devices and equipments, but also can be applied to the temperature and deformation detection. The tunable long period fiber grating structure in accordance to the present invention comprises a substrate; a periodic structure being disposed thereon and having a first coefficient of thermal expansion; a coupling agent, having a second coefficient of thermal expansion for fixing a fiber to the periodic structure; wherein the first and second coefficients of thermal expansion are different.

29 Claims, 7 Drawing Sheets

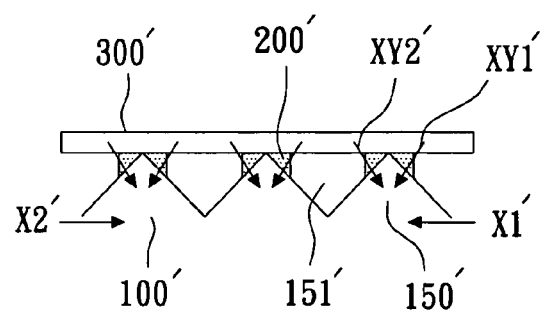
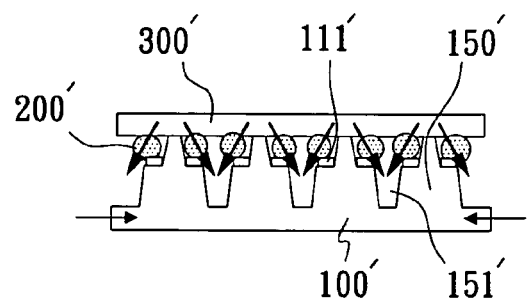
Fig. 3A　　　　　　　　Fig. 3B
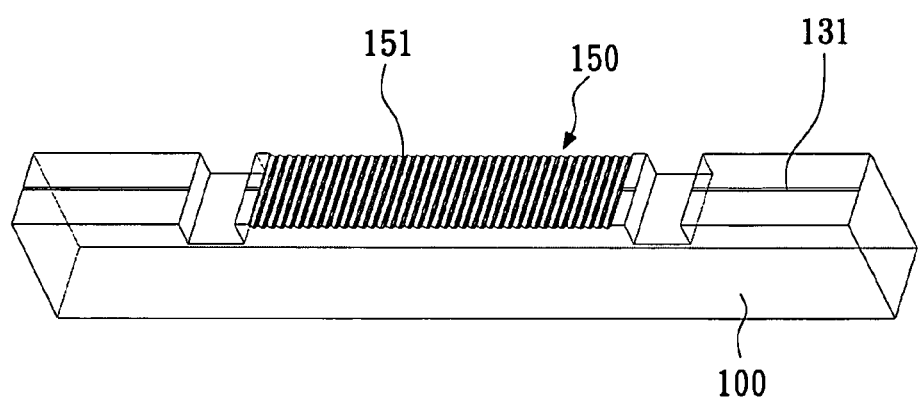
Fig. 4

1 — prepare a substrate having a c periodic structure made of material such as a metal, a semiconductor, a glass material, a ceramic material, a composite material or a plastic material, and the substrate has a first coefficient of thermal expansion;

2 — prepare a coupling agent such as a high-temperature solidification coupling agent or a room-temperature solidification coupling agent, and the coupling agent has a second coefficient of thermal expansion;

3 — fill the coupling agent into a periodic structure such as a general periodic structure or a progressively changing periodic structure, which is made by a mechanical manufacture, a semiconductor fabricating process, a metal or plastic injection molding a press molding or a stamping molding;

4 — dispose a whole single-mode optical fiber without a cladding layer on the periodic structure;

5 — use the coupling agent to fix the optical fiber on the periodic structure ;

6 — end

Fig. 11

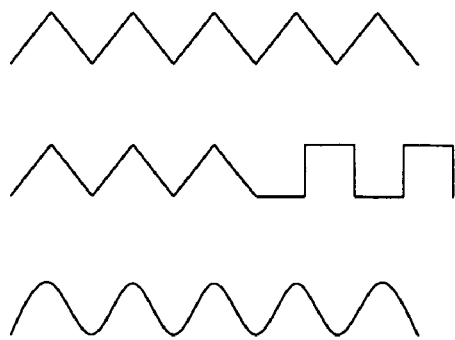
Fig. 12A
Fig. 12B
Fig. 12C
Fig. 12
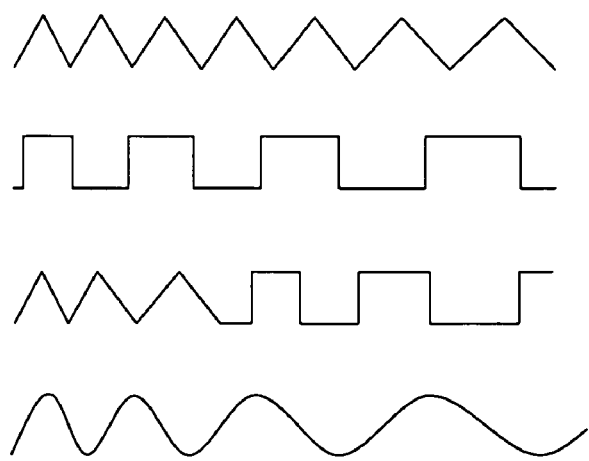
Fig. 13A
Fig. 13B
Fig. 13C
Fig. 13D
Fig. 13

TUNABLE LONG PERIOD FIBER GRATING STRUCTURE AND FABRICATION METHOD

FIELD OF THE INVENTION

The present invention relates to a tunable long period fiber grating structure and a fabrication method capable of producing an expected microbending deformation by adjusting the temperature and making use of the unmatched coefficients of thermal expansion between different materials, and thus creating a phenomenon similar to the mode coupling effect occurring in traditional optical gratings in order to provide the structure and fabrication method for having an effect of tuning wave spectra by controlling the temperature.

BACKGROUND OF THE INVENTION

Long period fiber grating is an important element in the optical communications market, and its main commercial applications include the use of a phase mask fabrication method to produce a grating on fibers, which serves as a band rejection filter, a mode converter, a band rejection filter or a gain equalizer in various applications. The long period fiber grating has its advantages of being an all-fiber device and exhibits very low loss when connected to fibers, a low insert loss and a low back reflection, etc. In addition, the long period fiber grating is highly sensitive to high temperature, curvature, twist, and load, and thus is applicable for the development of optical communications and sensors. However, the long period fiber grating produced by photolithography has different properties according to the different conditions of the manufacturing process and needs accurate control. Once a fiber is written, it cannot be recovered or revised anymore.

In view of the foregoing shortcomings, an external force type tunable simple-structured long period fiber grating becomes the key point for the development of long period fiber grating. Two U.S. patents regarding the long period fiber grating filters are described below:

The U.S. Pat. No. 6,282,341 B1 disclosed a tunable mechanically induced long-period fiber grating filter, and this filter comprises a pair of periodic mechanical structures (which could be a periodic structure plus a plate) for mounting the fiber inside, ridges of upper periodic and lower periodic structures being engaged and aligned with each other for directly applying pressure on the surface of a fiber as to define a grating by means of directly inducing perturbations in the refractive index caused by the photoelastic effect. By changing the pressure applied on the periodic structures and controlling the perturbations of the refractive index, the frequency spectrum (loss) can be tuned. With the design of the shape and arrangement of the periodic structures, the wavelength and spectral form can be changed and the polarization dependence loss can be eliminated. The idea of such patent resides on the photoelastic effect caused by the perturbations of the refractive index, which is a result of applying pressure on the fibers, and thus it is necessary to prevent the microbending. Besides, the fiber must be jacketed, or else it will have a lower efficiency and additional loss (1~2 dB).

The U.S. Pat. No. 6,408,117 B1 also disclosed mechanically induced long period fiber gratings. Unlike the foregoing patent, it only has a periodic structure on one side, but the other side is attached to a plate made of an elastic material for mounting a fiber between both sides. Screws are used for fixing and adjusting the tightness. The purpose of using an elastic material for the plate resides on producing a continuous microbending mode under the condition of applying an even pressure on the fiber to support the periodic structure when both sides of the periodic structure are engaged in order to produce a fiber grating. The objective of tuning the frequency spectrum can be achieved by adjusting the tightness of the screws, the selection of the elastic material, and the design, arrangement and change of the periodic structure. The idea of such patent emphasized on the fiber grating produced by the microbending, but the fiber must be jacketed (wrapped with plastics having a low refractive index), otherwise the intensity, the reliability and the depth of the frequency spectrum (loss) will be unsatisfactory.

SUMMARY OF THE INVENTION

The primary objective of the present invention is to provide a tunable long period fiber grating structure and fabrication method that controls the temperature to solve the problem of the fiber being damaged by using external mechanical forces to continuously produce microbending or photoelastic effect in the prior art.

The secondary objective of the present invention is to provide a tunable long period fiber grating structure and fabrication method that uses a simple combination of a small number of components to substitute a large number of devices used in the prior art so as to simplify the complicated manufacturing process and cost.

The present invention relates to a tunable long period fiber grating structure comprises a substrate; a periodic structure being disposed thereon and having a first coefficient of thermal expansion; a coupling agent, having a second coefficient of thermal expansion for fixing a fiber to the periodic structure; wherein the first and second coefficients of thermal expansion are different, and thus will cause the fiber to have a microbending phenomenon due to the different coefficients of thermal expansions of the two materials (which are the substrate and the coupling agent) to produce an effect similar to the fiber grating.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

FIGS. 3A and 3B are views of a second preferred embodiment of the present invention.

FIG. 4 is a perspective view of the substrate according to the present invention.

FIG. 11 is a flow chart of manufacturing a tunable long period fiber grating according to the present invention.

FIG. 12 is an illustrative view of a general periodic structure according to a preferred embodiment of the present invention.

FIG. 13 is an illustrative view of a chirping structure according to a preferred embodiment of the present invention.

DETAILED DESCRIPTION OF THE PREFERRED EMBODIMENTS

The detailed description and technical characteristics of the present invention are described together with the drawings as follows.

Figure 1:
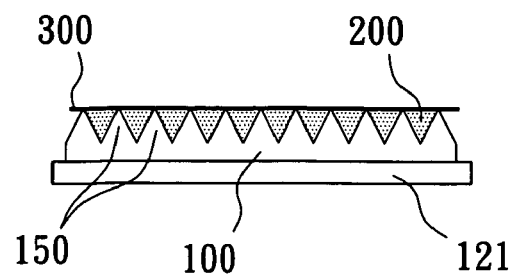
FIG. 1 is an illustrative view of the tunable long period fiber grating structure according to the present invention.

Please refer to FIG. 1 for an illustrative view of the tunable long period fiber grating structure of the present invention. The tunable long period fiber grating structure of the present invention comprises a substrate 100 having a periodic structure 150 with a first coefficient of thermal expansion; a coupling agent 200 for fixing a whole single-mode fiber 300 with no coating layer onto the periodic structure 150, and having a second coefficient of thermal expansion; and a thermoelectric cooling chip 121 for providing a temperature change effect for the tunable long period fiber grating structure of the present invention; or other devices such as a heating plate and a heating wire to achieve the same effect of controlling temperature; wherein the first coefficient of thermal expansion and the second coefficient of thermal expansion are different for producing an effect similar to the fiber grating by the microbending phenomenon of the fiber caused by different coefficients of thermal expansion of the two materials which are the substrate and the coupling agent under a temperature change. The temperature change and the designed periodic structure can change the waveform of the penetrating frequency spectrum such as the depth and resonance wavelength. The foregoing substrate is made of a metal, a semiconductor, glass material, ceramic material, composite material or plastic material; and the coupling agent is a high-temperature solidified coupling agent or a room-temperature solidified coupling agent.

Figure 5:
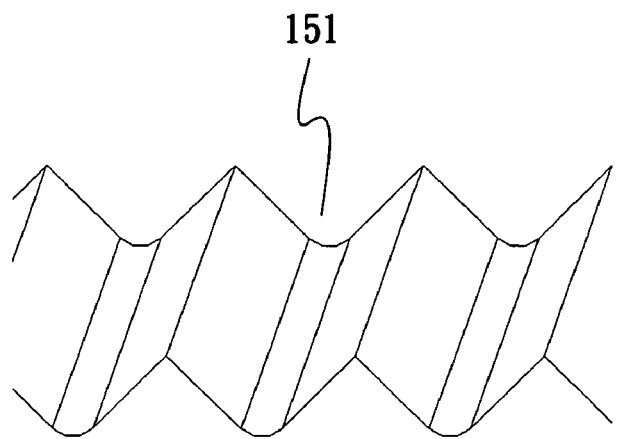
FIG. 5 is a perspective view of the periodic structure according to the present invention.

Please refer to FIG. 5 for a perspective view of the periodic structure of the present invention. A linear cutting fabrication method is used to produce a V-shaped groove 151 on a steel material with a periodic width of 650 microns, a depth of approximately 284 microns and an angle of 90 degrees. The round corner is created by the path of the linear cutting (diameter 200 microns). The periodic width of 650 microns is to satisfy resonance wavelength at the phase match conditions of 1530 nm and 1585 nm. The phase matching conditions and the basic characteristics of the long period fiber grating are described below. After a light wave passes through a long period fiber grating, a diffraction is produced to couple a core mode propagating in a positive direction to a cladding mode propagating in a positive direction and carry a level of a diffused light to satisfy the phase match conditions of the wavelength in the vacuum, the propagating constant of the core mode and the $n^{th}$ level clapping mode, and the periodic interval. If the clapping wavelength propagated into the core satisfies the phase match conditions (resonance wavelength), then the light will be guided into the cladding and cause a light energy loss in the cladding to form a loss peak. Such characteristic is the foundation of a wave.

The manufactured substrate 100 comprises a designed periodic structure 150, but the periodic structure 150, the coupling agent 200 and the single-mode fiber 300 on the substrate 100 are coupled with each other as shown in the following two embodiments including the fabrication method of filling up the periodic structure with the coupling agent and the fabrication method of filling a portion of the periodic structure with the coupling agent. These two fabrication methods are described as follows.

Figure 2A:
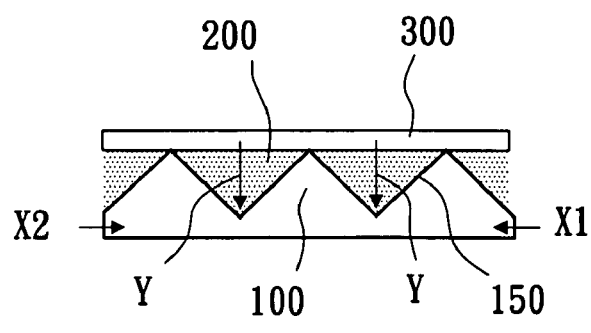
FIGS. 2A and 2B are views of a first preferred embodiment of the present invention.
Figure 2B:
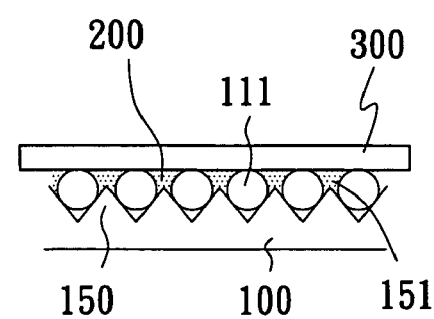

Refer to FIGS. 2A and 2B for the fabrication method of filling up the periodic structure with the coupling agent according to the first preferred embodiment of the present invention. In FIG. 2A, the coupling agent 200 is filled up in a groove 151 and then a fiber 300 is placed perpendicularly on the periodic structure 150. The fiber 300 will be completely adhered onto the periodic structure automatically due to the viscosity of the coupling agent 200 and the capillary effect. After the temperature is lowered and the structure is solidified, the coefficient of thermal expansion of the coupling agent 200 and the coefficient of thermal expansion of the substrate 100 are not equal, and thus the downward contraction force of the coupling agent 200 as indicated by fiber the arrow Y in the figure, the horizontal contraction force of the substrate 100 as indicated by the Arrows X1, X2 simultaneously form a microbending. On the other hand, if the temperature rises, the curvature of the fiber according to this embodiment is reduced. Refer to FIG. 2B for the embodiment adding a plurality of temperature control circuit 111. In FIG. 2B, the temperature control circuit 111 can be fixed into the groove 151 of the periodic structure 150, which can concurrently serve as a pivot of the fiber 300 and a device for adjusting the temperature as to control the temperature of the coupling agent 200 and the substrate 100 more directly. In this embodiment of filling up the periodic structure with the coupling agent, a better result will be achieved if the second coefficient of thermal expansion is defined to be larger than the first coefficient of thermal expansion.

Refer to FIGS. 3A and 3B for the fabrication method of filling a portion of the periodic structure with the coupling agent according to the second preferred embodiment of the present invention. In FIG. 3A, the coupling agent 200' is coated on the top of the periodic structure 150' and the top of the periodic structure 150' is sharp, in an arc shape or in any other shape, or the coupling agent 200 can be coated onto the external side of the periodic structure 150'. The groove 151' is not filled up, but only the end point in contact with the fiber 300' is coupled. When the temperature of the solidified structure drops, the main effects of the horizontal contraction force of the substrate 100' indicated by the Arrows X1', X2' and the contraction at the end point of the coupling agent 200' as indicated by the Arrows XY1', XY2' constitute a microbending. On the other hand, the curvature will be reduced if the temperature drops. Refer to FIG. 3B for the embodiment that adds a plurality of temperature control circuits 111'. The temperature control circuit 111' of this embodiment corresponds to each end point where the coupling agent 200' and the groove 151' for directly adjusting the temperature of the coupling agent 200'.

Figure 6:
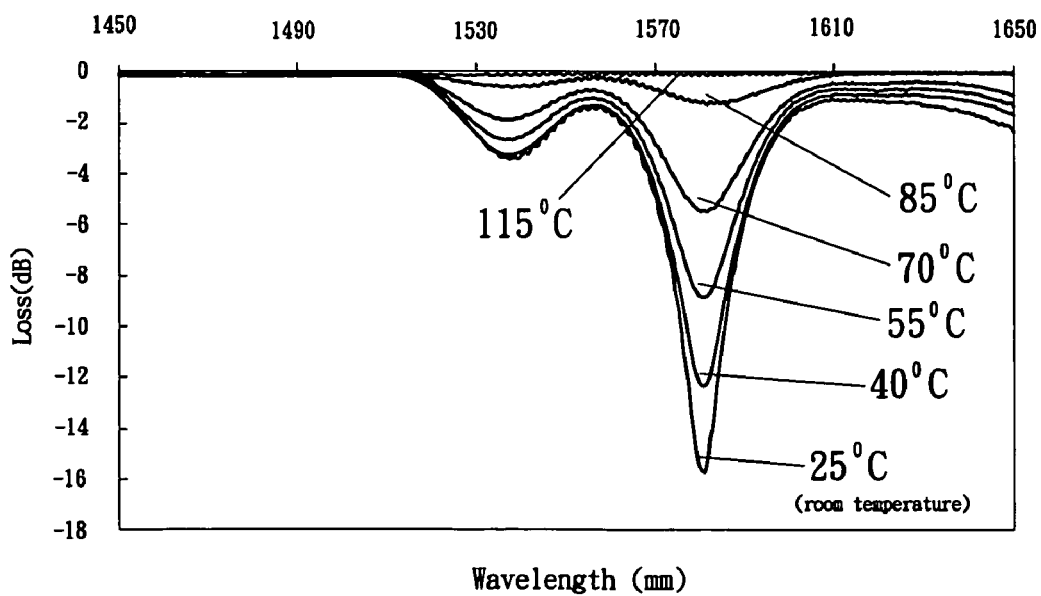
FIG. 6 is the frequency spectrum chart of the coupling agent that adopts heating for solidification according to the present invention.

Refer to FIG. 4 for the perspective view of the substrate according to the present invention. The numerals are the same as those adopted in FIGS. 2A, 2B and 3. The stainless steel substrate 100 comprises a groove 151 of the periodic structure 150 and a guide groove 131, and the guide groove 131 is a shallow semicircle (with a radius of 100 microns) for maintaining the fiber 300 in a position perpendicular to the groove 151 when it is adhered onto the surface of the periodic structure 150 and keeping the interval constant, and achieves the special change for the intervals by intentionally causing the fiber and the periodic structure to show a specific included angle or curvature. Different kinds of coupling agents are used for the hardening according to the foregoing embodiment can give different frequency spectrum characteristics as elaborated as follows:

If the coupling agent adopts heating for its solidification, such coupling agent is called a high-temperature solidification coupling agent such as the EPO-TEK353ND-T, which will be solidified by heating it at 150° C. for one hour. By that time, the fiber is maintained straight and level at a high temperature, and will be gradually cooled down to room temperature as the object cools after it is solidified. By the stress produced by the foregoing unmatched coefficients of thermal expansion, a progressively increased bending effect is obtained. The experiment result as shown in FIG. 6 shows the frequency spectrum chart of the coupling agent being solidified by heating according to the present invention. In FIG. 6, the high-temperature wave spectrum is flat at the temperature approaching 150° C., but the temperature will drop gradually and the two resonant wave peaks will become obvious.

Taking a periodic structure having a length of 30 periods for example, if the temperature reaches room temperature around 25° C., its second resonance mode loss is up to −16 dB.

Figure 7:
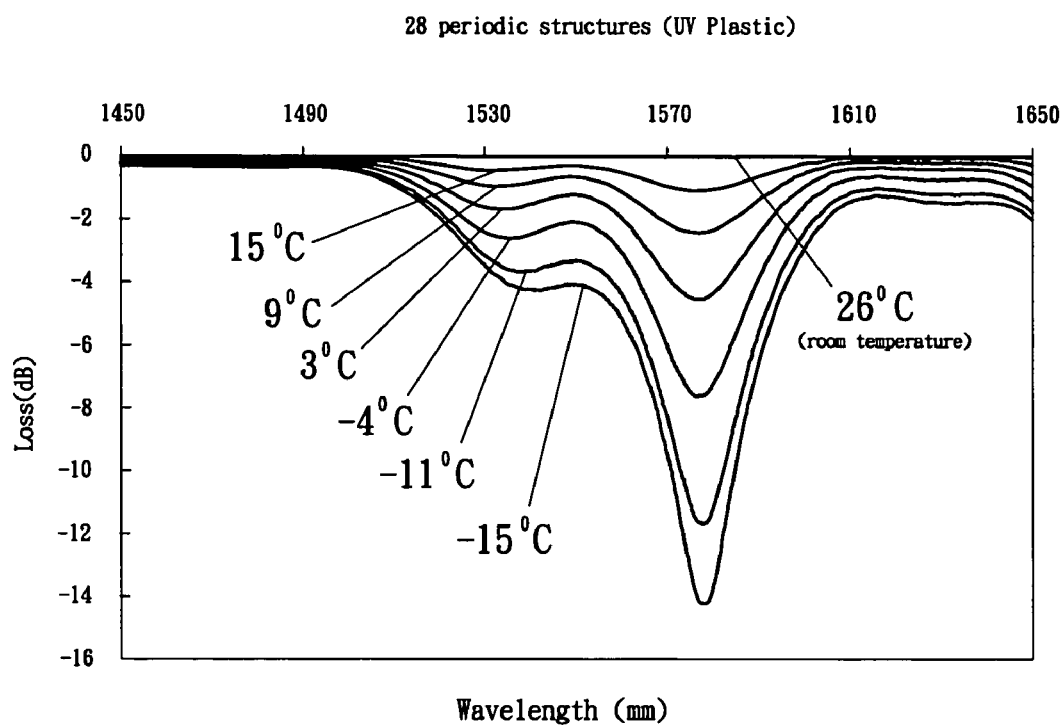
FIG. 7 is the frequency spectrum chart of the coupling agent that adopts room temperature for solidification according to the present invention.

If the room-temperature solidification coupling agent (i.e. the room temperature coupling agent) such as the ChemitechU-425 is adopted, it is necessary to expose the coupling agent under ultraviolet beams for several minutes for the hardening. By that time, the fiber is maintained straight and level at a constant temperature, and will be gradually cooled down to room temperature as the object cools after it is solidified. By the stress produced by the foregoing unmatched coefficients of thermal expansion, a progressively increased bending effect is obtained. FIG. 7 shows the wave spectrum of the room-temperature coupling agent of the present invention. In FIG. 7, the experiment result shows the room-temperature wave spectrum is flat at a constant temperature, but when the temperature gradually drops to −15° C., the second resonance mode loss peaks will be −14 dB for the periodic structure having a length of 28 periods.

In the foregoing experiments performed by two different types of coupling agents, the following two conclusions will be drawn:

1. A wave filter having a high-temperature solidification coupling agent is heated to lower its wave efficiency as to have the wave filter effect at room temperature and the waveform is flat at a high temperature as shown in FIG. 6.

2. A wave filter having a room-temperature solidification coupling agent drops its temperature to improve its wave filter efficiency. Therefore the wave filter has a flat waveform at room temperature and a wave filter effect only at a low temperature as shown in FIG. 7. Therefore, the two can be controlled to have the expected results by controlling the temperature.

In view of the description above, there are two ways of changing the wave filter effect, either by changing the method of coating the coupling agent on the periodic structure or using different types of coupling agents. Therefore, these two ways are used alternately to develop a plurality of feasible combination modes to comply with all kinds of situations.

Figure 8:
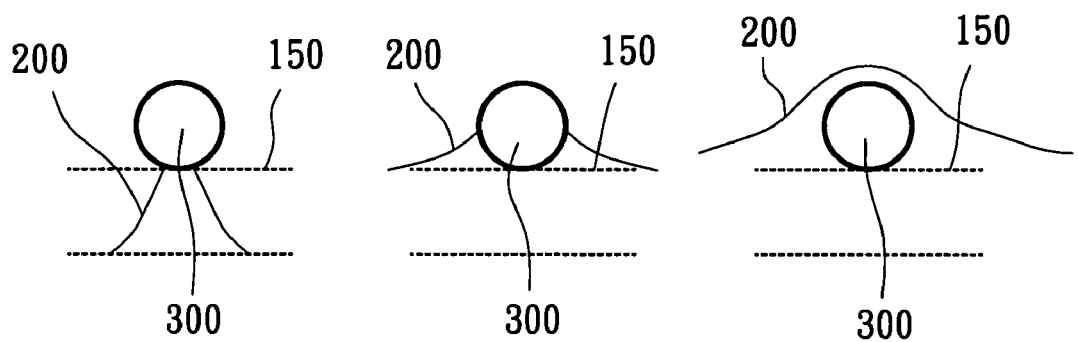
FIG. 8 is an illustrative view of three coupling modes of the coupling agent, periodic structure and fiber according to the present invention.

Refer to FIG. 8 for the illustrative view of three coupling modes for the coupling agent, the periodic structure and the fiber. In FIG. 8, the left figure shows that the coating height of the coupling agent 200 reaches exactly on the lower edge of the fiber 300. In other words, the coating height is the same as the height of the periodic structure 150. The figure in the middle shows that the coating height of the coupling agent 200 is exactly one half of the length of the fiber 300. The figure on the right shows that the coating of the coupling agent 200 submerges the fiber 300. Since the thickness of the coating of the agent coupling and the contact area of the fiber can change the periodic curvature of the fiber, an appropriate thickness (approximately half of the height of the fiber) can provide the best bending efficiency.

Figure 9:
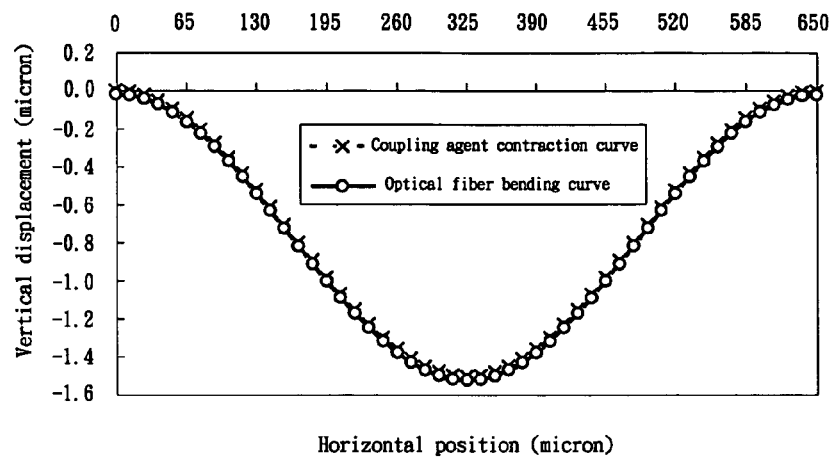
FIG. 9 is an illustrative view of the displacement of the most preferable mode of the coupling agent, periodic structure and fiber according to the present invention.

Refer to FIG. 9 for the illustrative view of the displacement of the most preferable mode of the coupling agent, periodic structure and fiber of the present invention. In FIG. 9, the design for the structure, profile and appearance of the periodic structure filled up with the coupling agent can be optimized to make each periodic curvature of the fiber and the contraction path of the coupling agent consistent to minimize the stress at the interface of the coupling agent and the fiber.

Figure 10:
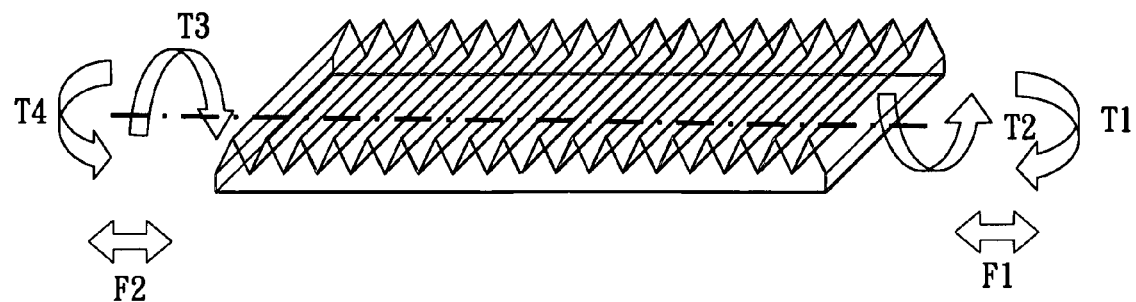
FIG. 10 is an illustrative view of controlling the external resultant force of the substrate according to the present invention.

Refer to FIG. 10 for the illustrative view of controlling the external resultant force of the substrate according to the present invention. In FIG. 10, a plurality of external forces indicated by the arrows F1, F2, T1, T2, T3, T4 respectively applied on the substrate 100 for changing the wave filter effect. Therefore, the present invention can help controlling external forces, in addition to its main purpose of controlling temperature.

Please refer to FIG. 11 for a fabrication method of manufacturing a tunable long period fiber grating structure, which comprises the steps of:

(1) preparing a substrate having a periodic structure made of a material such as a metal, a semiconductor, glass material, ceramic material, composite material or plastic material, and the substrate has a first coefficient of thermal expansion;

(2) preparing a coupling agent such as a high-temperature solidification coupling agent or a room-temperature solidification coupling agent, and the coupling agent has a second coefficient of thermal expansion;

(3) filling the coupling agent into a periodic structure such as a general periodic structure or a chirping structure, which is made by a mechanical machining, a semiconductor fabricating process, a metal molding, a plastic injection molding, a press molding or a stamping molding;

(4) disposing a whole single-mode fiber without a coating layer on the periodic structure;

(5) using the coupling agent to fix the fiber on the periodic structure;

(6) ending.

Where, the second coefficient of thermal expansion is different from the first coefficient of thermal expansion, and thus will produce an effect similar to the fiber grating by the microbending phenomenon of the fiber caused by the different coefficients of thermal expansion of the two materials including the substrate and the coupling agent under a temperature change. The temperature change and the designed periodic structure can change the waveform of the penetrating frequency spectrum such as the depth and resonance wavelength.

As described above, the periodic structure is divided into a general periodic structure or a chirping structure. Please refer to FIGS. 12 and 13 for the illustrative views of the general and chirping structures according to a preferred embodiment of the invention respectively. The periodic structure is an equidistant sharp serrate structure as shown in FIG. 12A, an equidistant mixed structure as shown in FIG. 12B and an equidistant wavy structure as shown in FIG. 12C. The chirping structure is a progressively changing equidistant sharp serrate structure as shown in FIG. 13A, a progressively changing equidistant flat serrate structure as shown in FIG. 13B, a progressively changing equidistant mixed structure as shown in FIG. 13C and a progressively changing equidistant wavy structure as shown in FIG. 13D. In the meantime, the structure of the periodic structure can have different quantity of periods to cope with the required width and depth of the frequency spectrum.

In view of the description above, the present invention uses different matters with different coefficients of thermal expansion, the temperature or the external force is controlled to achieve a tunable long period fiber grating structure. Regardless of the structural cost and technical ideas, they are different from the prior art, not only does it save costs and is it easy to understand the simple principle of technology, but it achieves the effect of being extensively applied for different conditions.

Further, its continuous serially connected substrates (periodic structures) give a synergic effect on the penetrating wave spectrum as to achieve the shaping and gain equalizing effects. Since it is an all-fiber component, therefore it fits the development for optical communications and sensors and serves as a band rejection filter, a mode converter, a gain equalizer, and a sensor for detecting pressure, displacement and temperature. As to the novelty and utility of the present invention, the present invention is novel for the following reasons. (1) It uses a single-mode fiber for the manufacture and does not need to etch cladding, which has the characteristics of a traditional long period fiber grating. In the meantime, the wave spectrum can be tuned. (2) It adopts the unmatched coefficients of thermal expansion and the structural design to produce a periodic microbending for the fiber by a change of temperature and achieves the wave filter effect. (3) When the materials are coupled, the selection for hardening (high temperature/room-temperature hardening) is provided to offer additional wave spectrum characteristics (normally on/off).

The present invention is usable for the following reasons. (1) It makes the long period fiber grating tunable and also overcomes the shortcomings of the fiber being exerted by forces or having a poor reliability. (2) It gives wave efficiency up to −21 dB by a single-mode fiber that adopts 35 periods at a small range of temperature change (22° C.). Therefore, the present invention complies with the patent application requirements and is submitted to the Patent and Trademark Office for review and granting of the commensurate patent rights.

What is claimed is:

1. A tunable long period fiber grating structure, comprising:
    a substrate, comprising a periodic structure and having a first coefficient of thermal expansion; and
    a coupling agent with a second coefficient of thermal expansion for fixing a fiber to said periodic structure; wherein said first coefficient of thermal expansion and second coefficient or thermal expansion are different and an effect of fiber grating is produced by the microbending phenomenon of said fiber caused by different coefficients of thermal expansions of said two materials of said substrate and said coupling agent under a temperature change.

2. The tunable long period fiber grating structure of claim 1, wherein said fiber is a single-mode fiber and the whole fiber is disposed on said periodic structure.

3. The tunable long period fiber grating structure of claim 2, wherein said single-mode fiber has no coating layer.

4. The tunable long period fiber grating structure of claim 1, wherein said substrate is one selected from the collection of a metal, a semiconductor, glass material, ceramic material, composite material and plastic material.

5. The tunable long period fiber grating structure of claim 1, wherein said coupling agent is one selected from the collection of high-temperature solidified agent and room-temperature solidified agent.

6. The tunable long period fiber grating structure of claim 5, wherein said coupling agent adopts a high temperature for solidification so that said tunable long period fiber grating structure has a wave filter effect and the high-temperature spectrum waveform is flattened.

7. The tunable long period fiber grating structure of claim 5, wherein said coupling agent adopts a room temperature for solidification so that said tunable long period fiber grating structure has a flattened spectrum at said room temperature and a wave filter effect at a low temperature.

8. The tunable long period fiber grating structure of claim 1, wherein said periodic structure is one selected from the collection of a general periodic structure and a chirping structure.

9. The tunable long period fiber grating structure of claim 8, wherein said general periodic structure is one selected from the collection of an equidistant sharp serrate structure, an equidistant flat serrate structure, an equidistant mixed structure and an equidistant wavy structure.

10. The tunable long period fiber grating structure of claim 8, wherein said chirping structure is one selected from the collection of a progressively changing equidistant sharp serrate structure, a progressively changing equidistant flat serrate structure, a progressively changing equidistant mixed structure and a progressively changing equidistant wavy structure.

11. The tunable long period fiber grating structure of claim 1, wherein said periodic structure is made by a manufacture fabrication method selected from the collection of a mechanical machining, a semiconductor fabrication process, a metal molding, a plastic injection molding, a press molding, and a punching fabrication method.

12. The tunable long period fiber grating structure of claim 1, wherein said periodic structure has different number of periods to cope with the required width and depth of a frequency spectrum, and the resonance wavelength of said frequency spectrum is determined by the distance between said periods.

13. A tunable long period fiber grating manufacturing fabrication method, comprising:
    (1) preparing a substrate having a periodic structure and said substrate having a first coefficient of thermal expansion;
    (2) preparing a coupling agent having a second coefficient of thermal expansion; and
    (3) preparing a fiber and using said coupling agent to couple said substrate with said fiber.

14. The tunable long period fiber grating manufacturing fabrication method of claim 13, wherein said step (3) further comprises the steps of:
- (3a) filling said coupling agent into said periodic structure;
- (3b) disposing the whole fiber on said periodic structure; and
- (3c) securing said fiber onto said periodic structure by using said coupling agent.

15. The tunable long period fiber grating manufacturing fabrication method of claim 13, wherein said fiber is a single-mode fiber.

16. The tunable long period fiber grating manufacturing fabrication method of claim 15, wherein said single-mode fiber has no coating layer.

17. The tunable long period fiber grating manufacturing fabrication method of claim 13, wherein said substrate is one selected from the collection of a metal, a semiconductor, glass material, ceramic material, composite material and plastic material.

18. The tunable long period fiber grating manufacturing fabrication method of claim 13, wherein said coupling agent is one selected from the collection of high-temperature solidified agent and room-temperature solidified agent.

19. The tunable long period fiber grating manufacturing fabrication method of claim 18, wherein said coupling agent adopting a high temperature for solidification as to let said tunable long period fiber grating structure has a wave filter effect and the high-temperature waveform is flattened.

20. The tunable long period fiber grating manufacturing fabrication method of claim 18, wherein said coupling agent adopting a room temperature for solidification as to let said tunable long period fiber grating structure has a flattened waveform at said room temperature and a wave filter effect at a low temperature.

21. The tunable long period fiber grating manufacturing fabrication method of claim 13, wherein said periodic structure is one selected from the collection of a general periodic structure and a chirping structure.

22. The tunable long period fiber grating manufacturing fabrication method of claim 21, wherein said general periodic structure is one selected from the collection of an equidistant sharp serrate structure, an equidistant flat serrate structure, an equidistant mixed structure and an equidistant wavy structure.

23. The tunable long period fiber grating manufacturing fabrication method of claim 21, wherein said chirping structure is one selected from the collection of a progressively changing equidistant sharp serrate structure, a progressively changing equidistant flat serrate structure, a progressively claiming equidistant mixed structure and a progressively changing equidistant wavy structure.

24. The tunable long period fiber grating manufacturing fabrication method of claim 13, wherein said periodic structure is made by a manufacture method selected from the collection of a mechanical machining, a semiconductor fabrication process, a metal molding, a plastic injection molding, a press molding, and a punching method.

25. The tunable long period fiber grating manufacturing fabrication method of claim 13, wherein said periodic structure has different number of periods to cope with the required width and depth of a frequency spectrum.

26. The tunable long period fiber grating manufacturing fabrication method of claim 14, wherein said step (3a) fills said coupling agent in said periodic structure by a method selected from the collection of filling up said coupling agent in said periodic structure and filling said coupling agent in a portion of said periodic structure.

27. The tunable long period fiber grating manufacturing fabrication method of claim 26, wherein said method of filling up said coupling agent in said periodic structure defines said second coefficient of expansion to be larger than said first coefficient of expansion to achieve a better result.

28. The tunable long period fiber grating structure of claim 1 further comprising a temperature controller.

29. The tunable long period fiber grating structure of claim 28, wherein said temperature controller is one selected from the collection of a thermoelectric cooling chip, a heating plate and a heating wire.

* * * * *